United States Patent
LeFiles et al.

(10) Patent No.: US 12,486,527 B2
(45) Date of Patent: Dec. 2, 2025

(54) SYSTEM AND METHOD FOR ANALYTE DETECTION AND DECONTAMINATION CERTIFICATION

(71) Applicant: Salvus, LLC, Valdosta, GA (US)

(72) Inventors: James LeFiles, Valdosta, GA (US); R. Clinton Beeland, Valdosta, GA (US); Ron Levin, Valdosta, GA (US)

(73) Assignee: SALVUS, LLC, Valdosta, GA (US)

( * ) Notice: Subject to any disclaimer, the term of this patent is extended or adjusted under 35 U.S.C. 154(b) by 745 days.

(21) Appl. No.: 17/215,570

(22) Filed: Mar. 29, 2021

(65) Prior Publication Data

US 2021/0301317 A1 Sep. 30, 2021

Related U.S. Application Data

(60) Provisional application No. 63/147,426, filed on Feb. 9, 2021, provisional application No. 63/000,581, filed on Mar. 27, 2020.

(51) Int. Cl.
*C12Q 1/24* (2006.01)
*A61L 2/24* (2006.01)
(Continued)

(52) U.S. Cl.
CPC ............. *C12Q 1/24* (2013.01); *A61L 2/24* (2013.01); *A61L 2/28* (2013.01);
(Continued)

(58) Field of Classification Search
CPC ..... A61L 2/18; A61L 2/22; A61L 2/24; A61L 2/28; A61L 2202/14; A61L 2202/16;
(Continued)

(56) References Cited

U.S. PATENT DOCUMENTS 5,882,590 A * 3/1999 Stewart ............... A61L 2/28
422/108
10,191,036 B1 * 1/2019 Bequette ........... G01N 33/1826
(Continued)

FOREIGN PATENT DOCUMENTS

CN 204876005 U * 12/2015
KR 10-0353305 B1 12/2002
(Continued)

OTHER PUBLICATIONS

United States Environmental Protection Agency (EPA), "Laboratory Data Review for the Non-Chemist", Oct. 2014 (Year: 2014).*
(Continued)

*Primary Examiner* — Jennifer Wecker
*Assistant Examiner* — Brady C Pilsbury
(74) *Attorney, Agent, or Firm* — Barnes & Thornburg LLP (57) ABSTRACT

A portable analyte detection system and related methods are provided. The detection system includes a detector having one or more probes and associated detector circuitry that is in communication with a mobile device. The system displays real-time decontamination feedback, initiates decontamination processes, and displays process completion notification or automatically implements decontamination shutoff. The server tracks location information and analyte levels for products and communicates with third party certification servers.

18 Claims, 6 Drawing Sheets

(51) Int. Cl.
*A61L 2/28* (2006.01)
*G01N 33/543* (2006.01)
*A61L 2/22* (2006.01)

(52) U.S. Cl.
CPC .......... *G01N 33/54373* (2013.01); *A61L 2/22* (2013.01); *A61L 2202/14* (2013.01); *A61L 2202/16* (2013.01); *A61L 2202/25* (2013.01)

(58) Field of Classification Search
CPC ............ A61L 2202/17; A61L 2202/25; G01N 33/54373; C12Q 1/00; C12Q 1/06; C12Q 1/22; C12Q 1/24; C12M 1/34
See application file for complete search history.

(56) References Cited

U.S. PATENT DOCUMENTS

| | | | | |
|---|---|---|---|---|
| 2008/0221006 A1* | 9/2008 | Heisig | ...................... | C11D 3/48 510/245 |
| 2012/0167325 A1* | 7/2012 | Omidi | ................... | G01N 21/27 15/210.1 |
| 2013/0085349 A1* | 4/2013 | Shaanan | ............ | A61B 5/15194 600/301 |
| 2014/0336083 A1 | 11/2014 | Khattak et al. | | |
| 2016/0016171 A1 | 1/2016 | Goel | | |
| 2016/0041074 A1* | 2/2016 | Pliskin | ............... | G01N 15/0625 422/3 |
| 2018/0105857 A1* | 4/2018 | Pan | ........................ | C12Q 1/005 |
| 2018/0256103 A1* | 9/2018 | Cole | ................... | A61B 5/14546 |
| 2020/0061223 A1* | 2/2020 | Hallack | .................. | B60N 2/002 |
| 2022/0137038 A1* | 5/2022 | Chou | ................... | G06V 10/774 348/135 |

FOREIGN PATENT DOCUMENTS

| | | |
|---|---|---|
| KR | 10-2016-0057481 A | 5/2016 |
| KR | 10-2019-01061281 | 9/2019 |
| WO | 9800176 A1 | 1/1998 |
| WO | 2014164933 A1 | 10/2014 |

OTHER PUBLICATIONS

International Preliminary Report on Patentability dated Oct. 6, 2022 for PCT/US2021/024615.

International Search Report and Written Opinion dated Jul. 20, 2021 for PCT/US2021/024615.

Extended European Search Report dated Mar. 26, 2024 for European Application No. 21776717.7.

* cited by examiner

SYSTEM AND METHOD FOR ANALYTE DETECTION AND DECONTAMINATION CERTIFICATION

CROSS REFERENCE TO RELATED APPLICATIONS

This application claims the benefit of U.S. Provisional Application No. 63/000,581, filed Mar. 27, 2020, and U.S. Provisional Application No. 63/147,426, filed Feb. 9, 2021, the contents of which are hereby incorporated by reference.

BACKGROUND

Analyte contamination is a problem for many industries, including the healthcare industry, and for the general public alike. Members of the public have a need to know that the surfaces, air and other products they are in contact with are free from contamination. Current pathological decontamination practices typically include cleaning with copious amounts of bleach and water (or other commercial cleaning products) and delays caused by the need to send out for lab results verifying adequate decontamination has been achieved. Thus, there exists a need for a safe and effective system and method for pathological detection, decontamination, cleaning and certification as well as monitoring or providing notification regarding the presence of analyte contamination.

SUMMARY

An analyte detection and monitoring system is provided. The system includes at least one portable detector having a probe and detector circuitry for detecting an analyte in a sample and producing analyte detection data; and at least one mobile device configured to wirelessly receive the analyte detection data from the portable detector and transmit the analyte detection data from the portable detector to a processor in real-time, wherein the processor is configured to: quantify a level of analyte; monitor the level of analyte; and display, in real-time, on the mobile device all data related to type and level of analyte present. According to one embodiment, the mobile device is configured to transmit a signal to initiate a decontamination operation when a predetermined level of analyte contamination is achieved. According to one embodiment, the mobile device is configured to receive and display a decontamination completion notification received from the processor in response to determination by the processor that the transmitted analyte data indicates an analyte level in the sample, if present, has reached a predetermined level. According to one embodiment, the mobile device is further configured to, in response to receiving the decontamination completion notification, automatically transmit a shut-off instruction to decontamination equipment being used in the decontamination operation. According to one embodiment, subsequent to transmitting the shut-off instruction, the mobile device is configured to transmit an identifier to the processor. According to one embodiment, the mobile device is further configured to, in response to receiving real-time analyte level data processed by the processor from the analyte detection data, within a predetermined analyte level range, automatically transmit a shut-off instruction to processing equipment or safety equipment in communication with the mobile device. According to one embodiment, the mobile device is selected from the group consisting of a smartphone, tablet, and portable computer. According to one embodiment, the detector and mobile device are integrated into a single mobile, hand-held system. According to one embodiment, the portable detector comprises a plurality of probes, each of the probes configured to detect a different analyte. According to one embodiment, the portable detector includes a collection apparatus configured to receive a target sample. According to one embodiment, the mobile device is configured to: wirelessly receive analyte detection data from the portable detector for each of a plurality of probes and to transmit the analyte detection data from the portable detector to a processor in real-time; and receive and display on the mobile device real-time analyte level data for each of a plurality of different analytes determined by the processor from the analyte detection data for the plurality of probes.

A method of determining and monitoring the level of analyte in a sample is provided. The includes the steps of: introducing a probe of a portable detector system to a sample, wherein the probe is configured to detect at least one analyte in the sample; wirelessly transmitting analyte detection signals from detection circuitry in communication with the probe to a mobile device of the portable detector system; transmitting, in real-time, the analyte detection signals from the mobile device to a processing system; receiving, in response to the transmitted analyte detection signals, real-time analyte level data processed by the processing system from the analyte detection signals; and displaying the real-time analyte level data to a user on a display of the mobile device such that the level of analyte is viewable and continuously monitored. According to one embodiment, the sample is taken from a surface, air, human or animal. According to one embodiment, the sample is taken from an industrial equipment component or a food surface. According to one embodiment, the sample is taken from a public or private space selected from the group consisting of a food processing facility, healthcare facility, airport, train station, border crossing, and office space. According to one embodiment, the portable detector system includes a plurality of probes, each of the probes configured to detect a different analyte; and the method further includes concurrently transmitting analyte detection signals from detection circuitry in communication with each of the plurality of probes to the mobile device of the portable detector system. According to one embodiment, introducing the probe of the portable detector system to the sample comprises introducing the probe into rinsate from a rinsate collection apparatus connected to a surface during a decontamination process. According to one embodiment, the method further includes the step of initiating decontamination; receiving a decontamination completion notification from the remote processor in response to determination by the remote processor that the transmitted detection signals indicates a analyte level in the sample has reached a predetermined acceptable level and transmitting a certification the mobile device or third party that an analyte level in the sample has reached a predetermined acceptable level. According to one embodiment, the mobile device, in response to the decontamination completion message, transmits a shut-off command configured to automatically shut of equipment being used in the decontamination process. According to one embodiment, the method further includes the step of allowing entry or exit of an animal or human that exhibits the absence or predetermined acceptable level of analyte. The analyte from the animal or human may be obtained from a bodily fluid such as saliva or blood.

According to yet another aspect, a method for managing analyte certification data based on real-time testing of analytes at local stages of production of a product is provided.

The method may be executed in a system having a plurality of product handling facilities at different geographic locations, where each of a plurality of portable analyte detection systems located at a respective one of the product handling facilities is in communication with a central analyte tracking server. In this system, the central analyte tracking server receives user and device identification from a portable analyte detection system at one of the plurality of product handling facilities. The server also receives real-time analyte detection data from the portable analyte detection system. The server determines a analyte type and a current analyte level data from the received analyte detection data, and then transmits the current analyte level data to the portable analyte detection system for display at the portable analyte detection system. Determining the analyte type and transmitting the current analyte level data is performed in real-time and, in response to determining that the current contamination level has reached a desired threshold, the server transmits a completion notification to the portable analyte detection system. According to one embodiment, after determining the analyte type and transmitting the current analyte level data in real-time, a signal to perform a decontamination step is optionally sent. The decontamination step may then be performed and continued until an acceptable level of analyte contamination is achieved. The decontamination step may be performed by any acceptable decontamination apparatus appropriate for the target demonstrating contamination. The step of decontamination of a target may include the step of producing a mist, aerosol or other acceptable air-based liquid suitable to decontamination of a target. The liquid portion of the mist or aerosol may be a decontamination composition capable of killing, elimination or otherwise reducing the presence of a pathogen.

BRIEF DESCRIPTION OF THE DRAWINGS

FIG. 1 illustrates a system for real-time analyte detection and decontamination certification according to one embodiment.

FIG. 2 illustrates one embodiment of detector circuitry that may be implemented in the detector of FIG. 1.

FIG. 3 illustrates an embodiment of functional layers that may be implemented in the remote server of FIG. 1.

FIG. 4 is a diagram illustrating the types of data records that may be stored in the data storage layer of the remote server of FIG. 1

FIG. 5 is a flow diagram of a method for detecting analyte levels and tracking certification-related data executable in the system of FIG. 1.

FIG. 6 illustrates a mobile device of the detector system of FIG. 1 and exemplary analyte processing and decontamination equipment controllable by the mobile device in one embodiment.

FIG. 7 illustrates a computer system which may be implemented in, or as, one or more parts of the system illustrated in FIG. 1.

DETAILED DESCRIPTION

One or more aspects and embodiments may be incorporated in a different embodiment although not specifically described. That is, all aspects and embodiments can be combined in any way or combination. When referring to the system and methods disclosed herein, the following terms have the following meanings unless indicated otherwise. The following definitions are meant to clarify, but not limit, the terms defined. If a particular term used herein is not specifically defined, such term should not be considered indefinite. Rather, terms are used within their accepted meanings.

As used herein, the term "analyte" refers to a substance that is detected, identified, measured or any combination thereof by the systems provided herein. The analyte includes any solid, liquid, or gas affecting (positively or negatively) a body of interest. The analyte includes, but is not limited to chemicals, microbes (beneficial or pathogenic), biomarkers, RNA, DNA, pathogen, antigen or portion thereof, antibody, virus (dead or alive), metabolite generated as a reaction to disease or infection, or viral protein. The virus proteins include the major structural proteins including spike, membrane, envelope and nucleocapsid which are commonly found on the surface of viruses. Particular examples of viruses include, but are not limited to, influenza virus (strain A or B), sever acute respiratory syndrome (SARS), SARS coronavirus (CoV) and SARS-CoV-2 (i.e., Covid-19).

As used herein, the term "pathogen," "pathological" and "pathological organism" refer to any bacterium, virus or other microorganism (fungi, protozoa, etc.) that can cause disease.

As used herein, the terms "decontamination" and "cleaning" may be used interchangeably and refer to the removal or killing of one or more analytes to reach an acceptable, predetermined level of analyte.

As used herein, the terms "target," "sample" and "target sample" all refer to any matter (e.g., solid, liquid or gas) that may be subject to the methods and systems provided herein. Particularly, these terms refer to any matter (animate or inanimate) where an analyte is capable of being detected, monitored, cleaned or any combination thereof. Suitable examples of targets include, but are not limited to, any animate or inanimate surface, soil, food, ambient air, laboratory, hospital, human (skin, hair or bodily fluid (blood or saliva)), animal (skin, hair or bodily fluid (blood or saliva)), an agricultural field, and any environmental location where analyte contamination is a concern. According to some embodiments, the target sample may be a pasture or livestock animals, a public space or a healthcare setting.

In order to address the need for faster and more reliable handling of pathological detection, monitoring, decontamination and to provide for verification or certification of reduced exposure to pathological organisms, on-site portable contamination testing systems and methods are described herein.

Methods and systems are provided herein to address the need to monitor and certify samples and perform tests as well as provide results in real-time. Additionally, methods and systems for using this real-time analyte contamination detection to reliably track and verify a sample's exposure to analytes such as pathological contaminants are disclosed.

A system for analyte detection, monitoring and decontamination is provided. The system is mobile or portable for ease of use in various environments. The system may be hand-held. The system may include a variety of components as provided herein within a rugged, stable shell or case. The system may also be powered via alternating current or direct current. The direct current may be provided by a battery such as, for example, one or more lithium, alkaline, gel, or AGM batteries, including deep cycle batteries. The direct current may be provided by alternative sources such as wind or solar. The alternative sources may provide current directly or be stored in one or more appropriate batteries for later use.

The system may be equipped with one or more software packages loaded within. The software may be electronically connected to the various system components as provided herein. The software may also be electronically integrated with a display for viewing by a user. The display may be any variety of display types such as, for example, a LED-backlit LCD. The system may include a memory component such that operating instructions for the system may be stored and all data related to detected analyte levels may be stored or archived for later retrieval or downloading onto a workstation or smartphone.

According to one embodiment, the system may include a collection component. The collection component may include an inlet for sample collection (i.e., a solid, fluid, or air-based sample). The collection component may be a physical extension of sampling area with an electronic signal connection to a detector component as described herein. The collection component may include or be connectable to a probe designed to generate a signal when exposed to a specific analyte.

According to one embodiment, wherein the wireless signal is processed with specialized algorithms based on chemistry, biology, physics, and/or quantum mechanics by a remote server and the output data is nearly instantaneously wirelessly transmitted back to the mobile system from the remote server certifying an acceptable level of analyte when achieved. According to one embodiment, the sensing unit is mobile and sized to be hand-held. According to one embodiment, current versions of the algorithms appropriate to the analytes being tested are loaded on the sensing unit to allow it to operate independently of wireless communications. The mentioned algorithm may include the ability to combine inputs from sensors based on differing technologies to identify substances that individual sensing technologies would typically not be able to distinguish.

According to one aspect, a method of determining and monitoring the level of analyte in a sample is provided. The method includes the steps of collecting a sample and detecting any analyte in the sample. In different embodiments, the sample may be taken from the air, a surface, or any of a number of other analyte host environments. According to one embodiment, the method further includes the step of transmitting a signal regarding the level of analyte in the sample to a device at a remote destination. The remote destination device may be a locally operated mobile or portable device, such as a smart phone, tablet device, pad, or laptop computer. In other embodiments, the remote destination may be a stand-alone or networked computer, cloud device, or server accessible via a local portable device. According to one embodiment, when the signal is transmitted wirelessly to a remote server, a return signal is transmitted to the system providing certification when an acceptable level of analyte is achieved.

According to one embodiment, the system as provided herein includes a detector. The detector may utilize gold catalyzed chemiluminescence immunoassay, immunoassay in microfluidics, electropathological immunoassay, or dipstick immunoassay. According to one embodiment, the detector may utilize an interferometric or other analytical technique. According to one embodiment, the detector may utilize an interferometric sensor based on a planar optical waveguide. According to one embodiment, the detector may utilize immunoassays on top of the waveguide for detection of one or more analytes. According to one embodiment, the detector may include one more polymers. According to on embodiment, the detector may include, or function based on, an enzyme-linked immunosorbent assay. According to one embodiment, the detector may utilize one or more polypeptides, nucleic acids, antibodies, aptamers, carbohydrates, lipids, receptors, or ligands of receptors, fragments thereof, and combinations thereof such as that set forth in U.S. Patent Pub. No. 20080138797, the entirety of which is hereby incorporated by reference herein. According to one embodiment, the detector may provide a visible color change to identify a particular analyte. According to on embodiment, the detector may include a reference component that provides secondary confirmation that the system is working properly. Such secondary confirmation may include a visual confirmation or analyte reference that is detected and measured by the system.

According to one embodiment, the detector includes at least one filter. The filter may be located between the collection and component and the detector. According to one embodiment, the at least one filter includes activated charcoal. According to one embodiment, the at least one filter includes paper. According to one embodiment, the at least one filter includes at least one resin such as anion exchange resin, cation exchange resin, softener resin, or a combination thereof.

According to one embodiment, the detector analyzes a sample that may include one or more analytes that require detection and certification of a certain level. According to one embodiment, the detector is calibrated to detect certain levels of at least one analyte such as a pathogen. The detector may be sensitive down to a parts per million level. According to one, the detector may also be sensitive down to a parts per billion level. According to another embodiment, the detector may also be sensitive down to a parts per trillion level.

The detector may be sensitive to analyte that is present in a sample at the decigram level. According to one, the detector may also be sensitive to analyte present in a sample at the centigram level or centigram per milliliter level. According to one, the detector may also be sensitive to analyte present in a sample at the milligram level or milligram per milliliter level. According to one, the detector may also be sensitive to analyte present in a sample at the microgram level or microgram per milliliter level. According to one, the detector may also be sensitive to analyte present in a sample at the nanogram level or nanogram per milliliter level. According to one, the detector may also be sensitive to analyte present in a sample at the picogram level or pictogram per milliliter level.

By gathering and transmitting real-time sensor data from more than one type of probe, a computation layer of a remote server in the disclosed system may use an algorithm to interpret the signals in direct real-time comparison for immediately identifying and quantifying the concentration of different analytes. In alternative embodiments, the detector system may make the analysis and calculations itself without the use of the processing power of the remote server.

The sample introduced to the system described herein may be obtained from various sources. The source includes air and any surface that may have been in contact with a analyte. The system as provided herein may be placed in fluid communication with a sample vessel so as to detect and certify acceptable analyte levels in real time. The system as provided herein may be placed in fluid communication with a liquid, such as water, blood or saliva, so as to detect and certify acceptable analyte levels in real time. Fluid communication may be established via a tube or other conduit that allows any fluid containing at least one analyte to come in contact with, or flow through, the system as provided herein.

According to a particular embodiment, the source may be air surrounding a particular area where human or animal analyte contamination is a concern. The air may be in a public or private space. The air may also be indoors or outdoors. Exemplary indoor spaces include transportations hubs (airports, train stations, border crossings, etc.), hospitals, parks, schools, office spaces, and healthcare facilities. According to one embodiment, the detector may be optionally equipped to analyze additional environmental factors such as, for example, particulate matter (viable and otherwise), temperature, air speed, geolocation and humidity.

The system as provided herein may also include a transmitting component. The transmitting component may be in electronic signal communication with the detector component. The transmitting component sends or transmits a signal regarding real-time analyte level data. Such data may provide evidence of analyte removal and/or inactivation. The transmission of such data may include real-time transmission via any of a number of known communication channels, including packet data networks and in any of a number of forms, including text messages, email, and so forth. Such real-time transmission may be sent to a remote destination via a wireless signal. The wireless signal may travel via access to the Internet via a surrounding Wi-Fi network. The wireless signal may also communicate with a remote destination via Bluetooth or other radio frequency transmission. The remote destination may be a smart phone, pad, computer, cloud device, or server. The server may store any data for further analysis and later retrieval. The server may analyze any incoming data using artificial intelligence learning algorithms or specialized pathological, physical, or quantum mechanical expertise programed into the server and transmit a signal back to the system confirming an acceptable of analyte was achieved. According to one embodiment, the system or server may be equipped with, or have access to, analyte level reference data such that certification may be received by the system alerting a user that an acceptable level of analyte has been achieved. An acceptable level of analyte may be any predetermined level that is set by a rule-making authority such as, for example, the Environmental Protection Agency (EPA), the Food and Drug Administration (FDA), or Occupational Safety and Health Administration (OSHA).

According to one embodiment, the system includes a wired or wireless data link to a phone line. Alternatively, a wireless data link to a building Local Area Network may be used. The system may also be linked to Telephone Base Unit (TBU) which is designed to physically connect to a phone jack and to provide 900 MHz wireless communications thereby allowing the system to communicate at any time the phone line is available.

A method of determining the level of analyte in a sample is also provided. The method includes the step of collecting a sample. The sample may be from any source as provided herein. The method further includes the step of analyzing or otherwise detecting any analyte in the sample. The method utilizes at least one detector as described herein which is in electronic communication with the transmitting component.

The method further includes the step of displaying the analyte levels to a user of the system. The step of displaying the analyte levels may be carried out via projecting any real time data on a screen as described herein.

The method may further include the step of transmitting a signal regarding the level of analyte in the sample to a destination. The step of transmitting may occur via a wireless signal, Bluetooth, radio frequency, local area network, or via a traditional phone line. The signal from the system includes data related to the level of analyte in the sample and diagnostic information about the sensor and the parameters around its use. The destination may be smart phone, pad, computer, cloud device, or server. The destination may, in turn, communicate or signal the system that an acceptable level of analyte is achieved or that the level is unacceptable.

The method may further include the step of transmitting a certification the mobile device or third party that an analyte level in the sample has reached a predetermined acceptable level. Particularly, in the event the level of analyte is acceptable, the destination may communicate a certification of acceptable analyte level. The measured level of analyte may also be communicated along with or independent of the certification.

The certification may be based on environment standards promulgated by an authority such as, for example, the Environmental Protection Agency (EPA), the Food and Drug Administration (FDA), or Occupational Safety and Health Administration (OSHA). The certification may also be simultaneously submitted to a local or national authority such as, for example, the Center for Disease Control (CDC), EPA, FDA or OSHA. According to an alternative embodiment, the destination is a smart phone, pad, computer, cloud device, or server under the custody of a local or national authority such as, for example, the EPA, CDC, OSHA or FDA.

The certification may be stored and referred to later or presented at a later time at the request of a third party. The certification data may be stored on a local or remote server or database. The certification may be transmitted wirelessly via any acceptable transmission such as text, email or Bluetooth. The certification may also be printed with a hard copy stored by a user for later referral.

The method may further include the step of accepting a form of payment, rebate or other economic event for services rendered. Such a step may be performed at any point during the method as provided herein. According to one embodiment, an economic event may be required after detection of analyte but before any step of decontamination. According to one embodiment, an economic event may be required after detection and decontamination but before certification. According to one embodiment, an economic event may be required after certification.

The method may further include the step of disposing of the sample per legal requirements. Such legal requirements assure that any sample still containing unacceptable levels of analyte contamination are disposed of properly so as not to cause harm to a user or the environment.

A method can be integrated with a process of cleaning or decontaminating a surface, air or other target. The process of cleaning or decontaminating a surface includes the step of initiating decontamination. The process of cleaning or decontaminating a surface my include the step of adding a decontamination composition to a surface to form a rinsate. The decontamination composition is capable of killing, eliminating or otherwise reducing the presence of an analyte. According to such an embodiment, the surface may be in fluid communication with a pump for moving the decontamination composition across the surface and out to the system. The method may also include the step of attaching a collection apparatus to the surface so that any rinsate exiting the surface is channeled directly to the system for analysis. The method may also include the step of monitoring the detector until the detector indicates an acceptable level of analyte within the rinsate. The process may further include the step of disposing of the rinsate per legal requirements.

The step of cleaning or decontaminating a target may include the step of producing a mist, aerosol or other acceptable air-based liquid suitable to cleaning or decontamination of a target. The liquid portion of the mist or aerosol may be a decontamination composition capable of killing, elimination or otherwise reducing the presence of an analyte.

The step of cleaning or decontaminating a target may include introducing ventilation or air flow. According to one embodiment, the step of cleaning or decontaminating a target may include increasing existing ventilation or increasing existing air flow. Such steps related to ventilation and air flow are particularly suited for airborne analytes.

The method may further include the step of certification of acceptable analyte level after decontamination is complete. The certification may be stored, transmitted or printed as provided herein.

Figure 1:
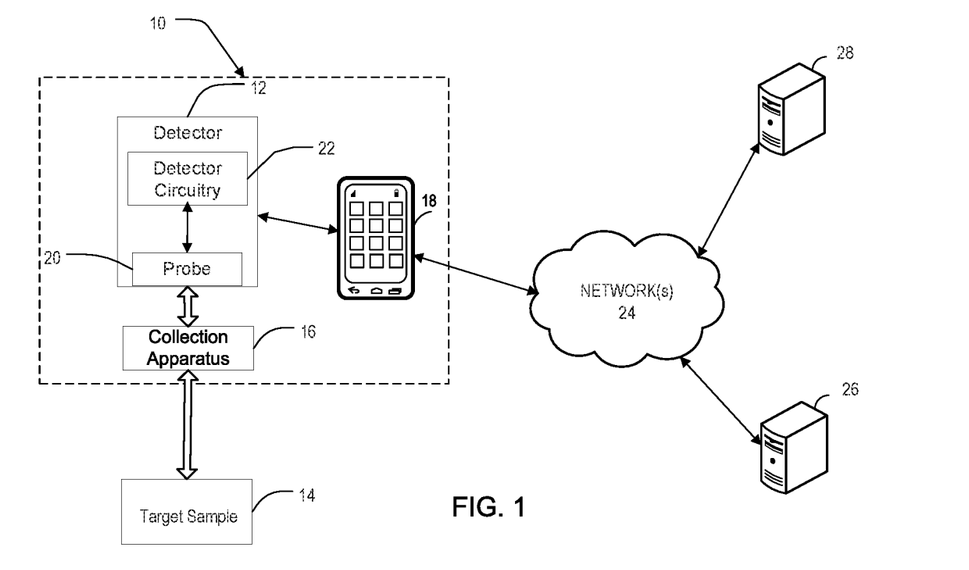

Referring to FIG. 1, an embodiment of an analyte detection system 10 is shown. The system 10, includes a detector unit 12, also referred to herein as a detector, configured to detect and analyze a target sample 14, via a collection apparatus 16. The collection apparatus 16 may be any of a number of devices configured to route the target sample 14 into contact with the probe 20 of the detector 12. For example, the collection apparatus 16 may be a liquid conduit, or liquid conduit and pump arrangement when the test item is a liquid. Alternatively, the collection apparatus may be a gas conduit, or a fan and gas conduit if the test item is a gas or in the ambient air. The collection apparatus 16 may be integrated with the detector unit 12. Alternatively, the collection apparatus 16 may be removably connectable to the probe 20 of the detector unit.

The detector 12 unit may communicate the raw data or findings of the probe 20 in real-time with a mobile device 18. The mobile device 18 may include logic stored in local memory on the mobile device to interpret the raw data and findings directly, or it may communicate over a network 24 with a remotely located server 26 to transfer the raw data or findings and request interpretation by logic located at the server 26. The mobile device 18 may be a handheld device, such as a smart phone, tablet, laptop computer that permits a user access to the real-time measurements of the probe and their real-time interpretation by a remote server 26. The mobile device 18 is a screen that may be operated via tactile buttons or via a touchscreen. As described in greater detail below, the real-time interpretation of analyte levels may be displayed to the user on the mobile device 18 with an indication of whether the amount of analyte is in a desired range.

According to one embodiment, the analyte detection system 10 and all associated internal and display components are entirely handheld in a single unit. According to such an embodiment, the detector 12, detector circuitry 22, probe 20, collection apparatus, and mobile device 18 are contained within a single, mobile unit that can be held in one hand. According to such an embodiment, the mobile device 18 is a screen that may be operated via tactile buttons or via a touchscreen.

In some embodiments, the information received back from the server 26 may include notification that a decontamination process is complete or that a process requiring a certain purity may continue, and/or may include instructions that the mobile device passes on to local decontamination or processing equipment to cease or begin operations automatically based on the detected aspects of the analyte. Additionally, the remote server may concurrently communicate results and modeling processes to a third party server 28 (such as the CDC or a governmental authority), insurer, or other interested party.

According to one embodiment, the detector 12 may be configured to look for a desired detection target and thus may be used to monitor or sample a desired substance for purity. In the context of decontamination or re-use of a surface, the detector unit 12 may be configured to look for a particular analytes. The detector unit may be used in conjunction with, or incorporate, decontamination equipment used to clean a vessel containing a test item or surface.

The detector unit 12 may include a probe 20 in communication with detector circuitry 22. The probe 20 may be a single purpose probe 20 designed for detection of one type of analyte, may include a plurality of probes 20 each designed to detect a different respective analyte, or may include one or more probes 20 each designed for detection of more than one type of analyte. As will be evident in the examples provided below, the probe 20 may be placed in contact with, or proximity to, the target item being measured via the collection apparatus. The detector circuitry 22 may be configured to translate probe information into electrical signals or data in a predetermined format and to transmit the electrical signals or data over a wireless (e.g., Bluetooth) or wired connection to the mobile device. Wired connections include, but are not limited to, one or more USB and Ethernet connections. The detector circuitry may perform some or all of any data adjustment necessary for the sensed information from the probe 20, for example adjustments to the sensed information based on probe type or age, or may simply pass the data on for transmission to the mobile device 18.

Figure 2:
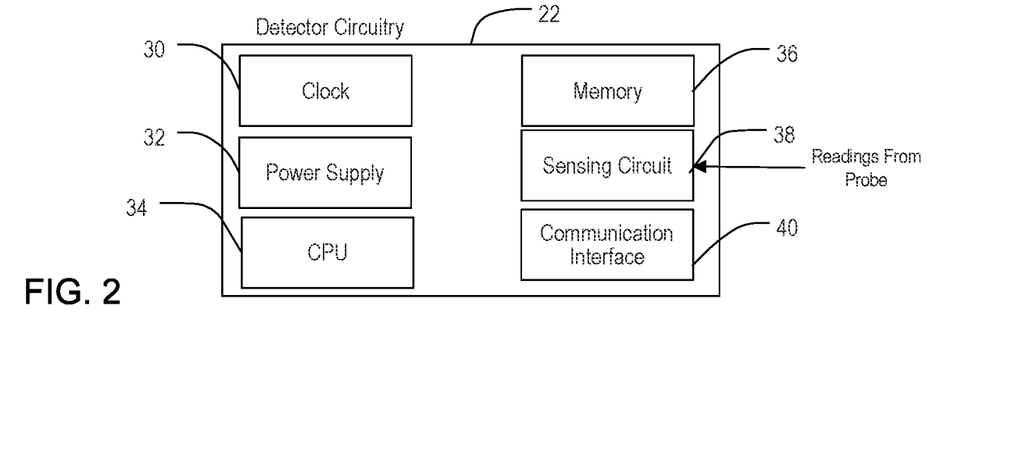

As illustrated in FIG. 2, an embodiment of the detector circuitry 22 is shown. The detector circuitry 22 included in the detector unit 12 may include a power supply circuit 32 (battery or AC), an internal clock 30 for tracking measurement times and dates for the associated probe 20, a sensing circuit 38 arranged to receive measurements or readings from the probe 20, and a communication interface 40 for communicating with the mobile device 18. The detector circuitry 22 may include a central processing unit (CPU) 34 or other controller, along with a memory 36 for storing executable instructions for operating the detector unit 12 and storing information sensed from the probe 20. The probe may include pathological, electrical, optical, and/or other sensitivity and is configured to translate the sensed information into electrical signals for the sensing circuit 38 to recognize. The CPU 34 may control the detector unit to transmit the data immediately from the sensing circuit 38 to the mobile device 18 via the communication hardware 40. Alternatively, the sensing circuit 38 may store the sensed information in the memory 36 and the CPU 34 may cause the sensed information to be transmitted at predefined intervals via the communication hardware 40. In yet other implementations, the CPU 34 may only direct the sensing circuit 38 to sample the probe 20 information at predetermined time intervals (e.g. a fixed number of milliseconds apart) and transmit the sensed information at the same, or a different, interval via the communication interface 40. The detector circuitry 22 may have the ability to compare signals that are generated by the probes to expected signal values. The results of the comparison may be reported to the user or communicated to a third party. According to one embodiment, the results of the comparison include values that are deemed acceptable as a result of the comparison.

Figure 3:
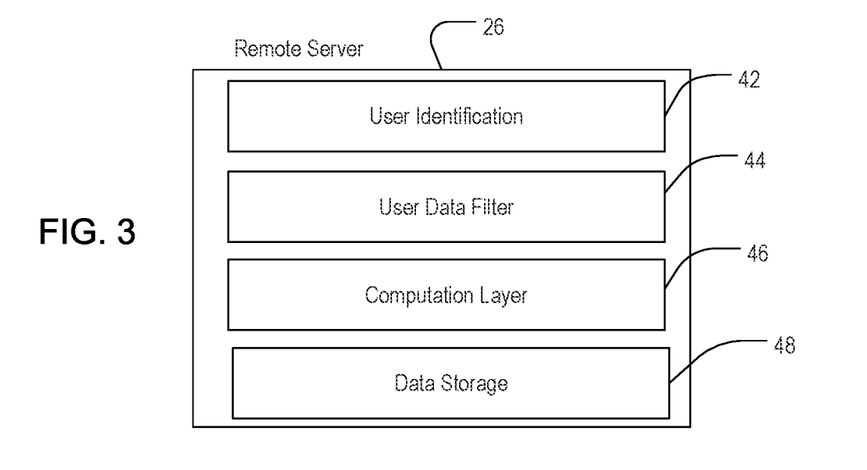

Referring to FIG. 3, the remote server 26 may be a computer configured as a web page host providing web-enabled services and including functional layers such as user identification management 42, a user data filter 44, a computation layer 46 and a data storage layer 48. The user identification management 42 may be a user authentication function to verify that authenticated users and mobile devices are properly screened and allowed access. The computation layer 46 may include functionality that receives raw or partially processed data from a detector 12 via a mobile device 18 and determines the type and level of analyte associated with the received data based on predetermined algorithms. Although the computation layer 46 functions of the server 26 may also, or alternatively, be stored in the mobile device 18 in certain embodiments, an advantage of real-time transmission of the detected data to the server 26 for processing is that greater processing power may be applied to more quickly translate the received data into analyte level determinations. Also, the central location of the computation layer 46 in the remotely located server 26 provides a centralized location with which to update and control the techniques used to translate the data from the various detectors 12. The centralized location of the computation layer 46 also allows for the compilation of data for modeling in real-time as well as validation. In different implementations, the computation layer 46 may implement artificial intelligence learning algorithms or specialized pathological, physical, or quantum mechanical expertise programs to process the real-time data into analyte levels for immediate transmission from the server 26 to, and display on, the mobile device 18.

Figure 4:
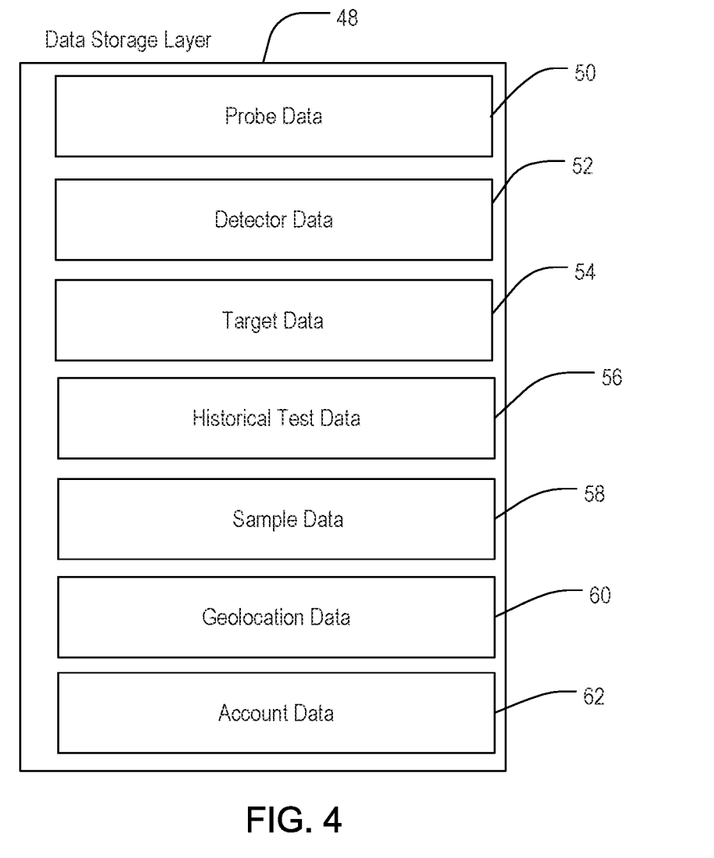

The data storage layer 48 may include data on users, devices, device types, and, as discussed in greater detail below, a history of analyte test results. Referring now to FIG. 4, an example of the data types stored in the data storage layer of the remote server is shown. The data storage layer may include probe data 50 for the various probes 20 that are associated with detectors 12 in the field and registered with the system. The probe data 50 may include information about each specific probe 20, such as the type and age of the probe (e.g. the number of tests run with the probe and the in service data of the probe). The probe data 50 may additionally include information on the probe's technology, including the substances testable by the probe alone or in combination with other probes, probe age calibration curves for use by the computation layer to adjust data received from the probe to account for potential effects of aging on the measurements, and probe technology interaction algorithms, for example this information may be an algorithm such as described herein to use multiple probe data received concurrently to differentiate for detection of a compound/analyte that may not be directly discernible by a single probe. Similarly, detector data on the detector 12 itself may be stored in the data storage layer 48 of the server 26. The detector data 52 may include serial number and MAC ID for the specific hardware, identification of authorized users, the location of the last use of the detector and the account identification associated with the detector 12. Data 54 that is descriptive of the target sample being tested and tracked may be included in the data storage layer 48 of the server 26. The data 54 may include the unique identifier of the target sample and the account identification (ID) of any account associated with the target sample or an account identification associated with the target sample itself. The data 54 may include geolocation data related to the location of the sample.

To provide improved tracking and certification of monitoring, decontamination and the history of analytes, the data storage layer 48 also may include historical test data 56 received from different detectors 12 and associated with specific locations or test sample. The historical test data 56 may be stored at a remote location, directly on the mobile device, or both. The historical test data 56 may include data for each test run, such as: a record that probe compatibility was confirmed for each test, the time stamps and detector values received for the test, the age of probe corrections and probe interaction factors determined for the test, and the calculated values for the analyte. Additionally, historical test data 56 for each test run may include location and identification information, such as the geolocation of the detector 12 at time of test, the identifier information for the vessel, detector, user, and probe(s) 20 for that test run, and the account identification (ID) of the entity for whom the tests are being run and tracked. In order to link the individual tests to a sample, the historical test data 56 may also include data 58 for the particular sample tested, such as the time stamps of the test, the location, a bar code (or other unique identifier), and a test identifier number. When the testing is performed at a food processing plant, the server 26 may also include the lot number, food description and or food pack universal product code (UPC) or other identifier and link that to the history of testing of the food and pathological exposure of the food that went into that lot of processed food. Geolocation information 60 on the location at which testing has been or will be performed may also be stored in the data storage layer 48. The location information 60 may include geofencing coordinates, such as perimeter coordinates, along with a description of the area, location or environment. Account data 62 may be stored in the data storage layer as well, including user IDs and associated information associated with each account that utilizes the system.

Any of a number of probe types and technologies may be used in different embodiments. An example of a probe type that maybe used to differentiate between often difficult to differentiate analytes may include probes that are an interferometric biosensor type. Such probes may include one or more molecularly imprinted polymers (MIP), antibody assay probes, aptamers, DNA, RNA or proteins. These probes may be part of a detection system 10 that produces real-time readings for which the rate of change of those readings output by the probes may be measured with the disclosed detection system 10. For example the probes may each generate a diffraction or interferometric pattern and the changes in that pattern are detected and analyzed by the computation layer or locally at the mobile device 18 of the detection system 10, and are translated into an analyte level, and not just a presence or absence of the analyte. In one implementation, the analyte level may be proportional to a rate of change of the diffraction pattern measured, such that an integration of the rate of change in the diffraction pattern may be used to determine concentration levels. This calculation may take place locally at the mobile device 18 or remotely at the server 26.

One embodiment of a method 300 for analyte detection using the systems described above is illustrated in FIG. 5. Using a handheld system such as illustrated in FIG. 1, the user may first enter a user identifier (ID) in the mobile device and the mobile device transmits that information to the remote server for authentication, along with automatically appending information on the detector 12, which may include probe and/or detection circuitry identifying information (at 302). The probe and/or detection circuitry identifying information may include serial number information for the probe 20 and detection circuitry 22, the Media Access Control (MAC) address for each and the Internet protocol (IP) network address. After receiving and transmitting data at the mobile device for authenticating the user, detector 12 and mobile device 18, the user may enter identifying information for the sample or item being cleaned (at 304). The sample may have a scannable code, such as an optically scannable bar code or QR code affixed to it that may be automatically scanned with the mobile device. Any of a number of identifier labelling techniques, such as radio frequency identifiers (RFIDs) and so on may be used. Alternatively, a unique serial number, code or other identifier associated with the equipment or target same may be manually entered into the mobile device 18 and transmitted to the remote server 26. Additionally, the user may use the mobile device to scan in or manually enter one or more substance/analyte identifiers, such as a Universal Product Code (UPC) for the one or more substances, to inform the remote server of the one or more analytes that the sensor will be providing data on during the decontamination process (at 306). The mobile device 18 may also include geolocation information in its communications with the server, either from a GPS sensor included in the mobile device 18 or a GPS software function capable of generating the location of the mobile device in cooperation with a cellular or other communication network in communication with the mobile device.

Figure 5:
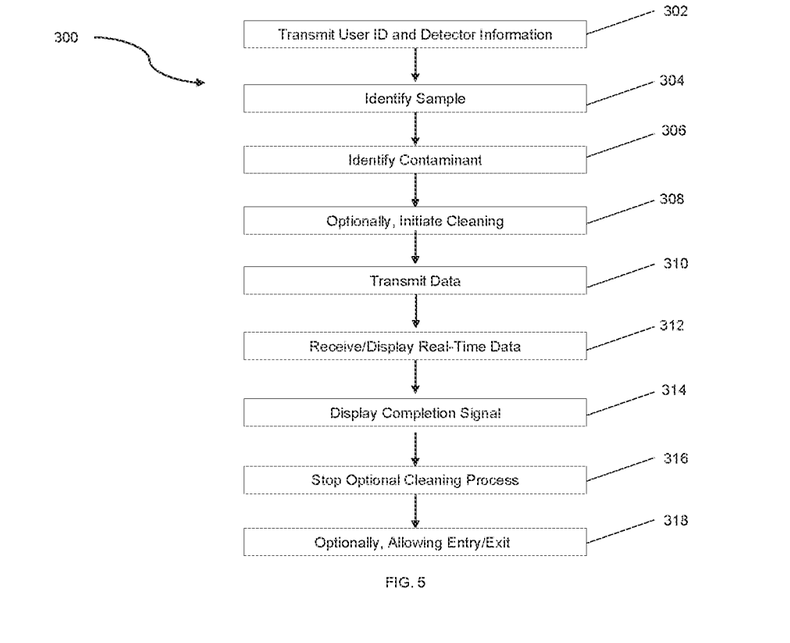

After authenticating the user and equipment information, and assuming that the server does not identify a mismatch in the probe capability and the type of analyte or substance to be tested, or any other user, device or location authenticity issue, the decontamination process may be optionally started, if needed (308). Real-time data from the probe and detection circuitry of the detector are transmitted to the mobile device 18. The mobile device 18 transmits the real-time data to the server and the server 26 processes the data in real-time to account for the age of the probe and probe type to determine analyte levels (at 310). If an unacceptable level of analyte is detected during monitoring, a signal may be sent to initiate a decontamination process. The ongoing analyte level measurements may be transmitted back to the mobile device 18 and displayed by the mobile device 18 to the user (at 312).

Once the server 26 determines from the detector data that the analyte level is low enough to meet the desired standard, the server 26 may transmit a completion signal to the mobile device 18 that may be displayed to the user (at 314) and prompts the user to then shut-off the decontamination process, if needed (316).

Although the data transfer for the sensed contamination information for the detector 12 may be sent to the remote server 26 for processing, and the remote server may then analyze that data to determine analyte level and immediately transmit back the analyte level information and a completion signal to the mobile device 18, in other embodiments, the mobile device may calculate and display the contamination level information and generate the completion signal internally. In this alternative embodiment, the mobile device may still perform the steps of authenticating user identification (ID), detector information, sample identification and analyte identification with the remote server 26 (steps 302, 304 and 306), but instead of then sending the raw sensed analyte data to the server 26, the mobile device may internally identify and determine the analyte level from the raw sensor data without transmitting it to the server 26. In this alternative embodiment, the algorithms for identifying analyte level, for adjusting calculation based on probe or other detector information and for recognizing the point (e.g. a predetermined analyte level threshold or predetermined analyte level range) when a desired analyte level has been reached may all be completed and generated at the mobile device itself. In order to implement this alternative embodiment, the memory of the mobile device may be pre-loaded with instructions for making the analysis, or the server 26 may transmit to the mobile device the instructions and other information for the mobile device to locally process the data in response to receiving the authentication and device identification information from the mobile device (steps 302-306).

In one alternative embodiment, the mobile device 18, may send a signal preventing operation of any decontamination process equipment, if there is a mismatch or other irregularity in the authentication information (user ID, geolocation information, etc.) provided to the server with the information contained in the server. For example, if the server determines from the analyte identifying information and the probe or other sensor identifying information that the probe 20 (or probes) is not suited to test for the analyte, then the server may send a signal notifying the user not to start the process. Alternatively, the server may send a command or instructions to the mobile device that is relayed to the decontamination equipment, to shut-off a power switch or other lockout device of the decontamination equipment to prevent the decontamination process from starting or continuing. In a variation of the above alternative, the mobile device 18 may receive the authentication or compatibility error from the server and determine locally to generate and send the power shut down command to the decontamination equipment.

In another embodiment, this automatic control of the decontamination process may be applied when a decontamination process has already started. For example, when the completion signal is received from the server for the decontamination process that is being monitored in real time (for example at steps 314 and 316 of FIG. 5) this same power shut down code capability may be used, where the completion signal of step 314 is either accompanied by a command to be forward by the mobile device to shut down the decontamination process, or by instructions for the mobile device to generate its own shut-down command to automatically stop the optional decontamination process, rather than simply waiting for the user to shut down the equipment after receiving the displayed completion notification.

The method 300 may optionally include the step of allowing entry or exit (step 318) of a subject (e.g., human or animal) that was subject to the steps of the method 300. Such a step may be initiated only after an acceptable amount of analyte is present or lack of analyte is detected. Allowing entry or exit may be accomplished by the system signaling opening or closing of doors, gates, and a variety of other entry points available in public or private spaces such as airports, offices, schools, office buildings (etc.). Such entry or exit may be assisted via an interlock mode within the system performing the method 300.

Figure 6:
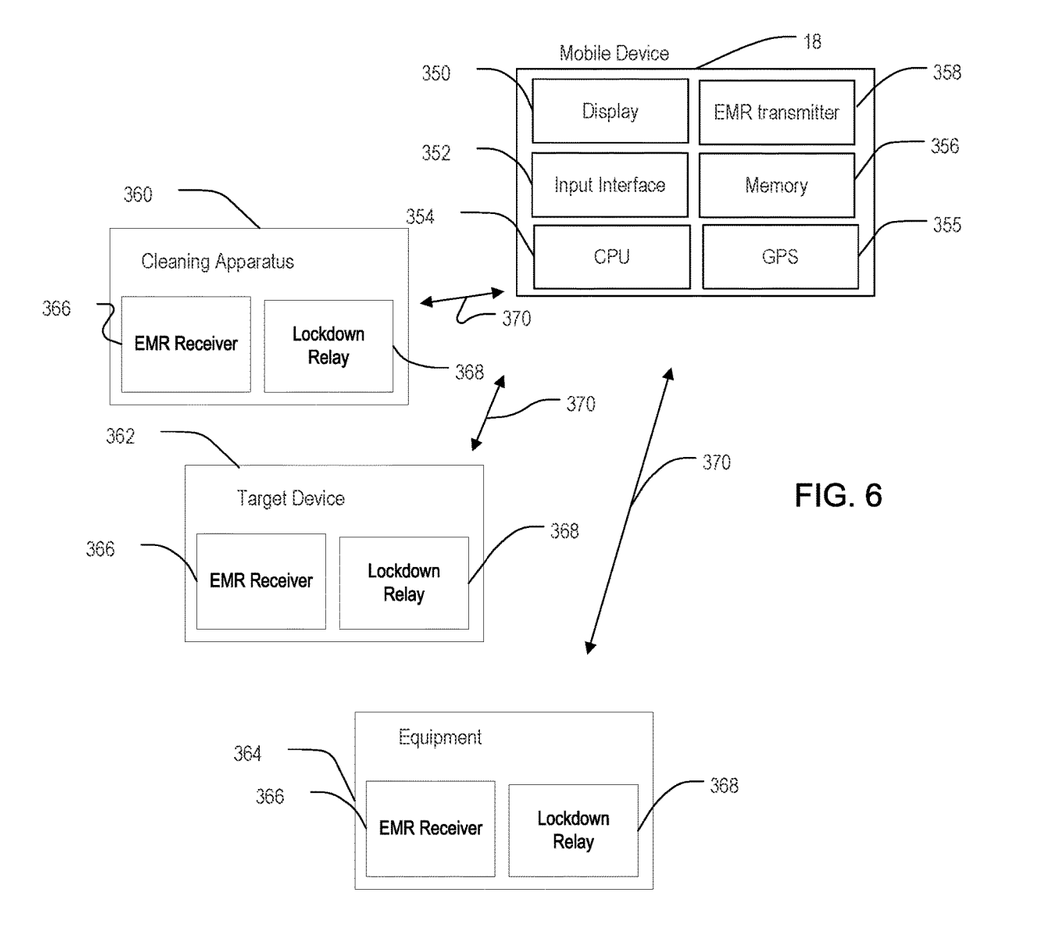

Referring to FIG. 6, in one implementation, an interlock-enabled system and process consists of the detection system 10, for example the mobile device 18 of the detection system 10, having a suitable electromagnetic radiation (EMR) transmitter 358, for example radio frequency, RFID, Wi-Fi, Bluetooth, cellular or optical technologies. The mobile device 18 may be a smartphone, tablet or other portable device having a display 350, user input interface 352, processor 354, GPS location function or sensor 355, memory 356 and one or more EMR transmitters 358. The equipment that mobile device 18 would be able to control based on the analyte detection results may include the entirety or a part of a sample decontamination apparatus 360, a target device 362, and equipment 364 involved in the processing or movement of a analytes near the mobile device 18. Any piece of equipment 360, 362, 364 controllable by the mobile device may include, either integrated in its circuitry or as a discrete add-on component, an EMR receiver 366 compatible with the EMR transmitter 358, and an EMR-activated relay 368.

As in the above example of automatically shutting down the decontamination process on location, the mobile device 18 of the detector system 10 may be programmed in memory 356 to send an EMR signal when sample results are within the specified range as determined locally or by the remote server. The EMR signal may be a direct wireless communication link 370 between mobile device and equipment 360, 362, 364 as illustrated, or may be via a communication path over one or more networks in communication with the equipment 360, 362, 364 and mobile device 18. Because the EMR receiver 366 is preferably linked to a relay 368 that controls the power to activate the connected equipment upon receipt of the signal, automated control of the particular equipment by the detection system 10 may be achieved. It is contemplated that the equipment that can be included in interlocked mode with the detection system may include shut-off valves, pumps, power control units, motors, and a variety of off/on switches available for industrial processes. Also, it is contemplated that the mobile device 18 would only be able to control the particular piece of equipment 360, 362, 364 located in geographical proximity to the mobile device based on the testing or authentication taking place at the processing stage where the user and mobile device are located. The various different pieces of equipment 360. 362, 364 illustrated in FIG. 6 are representative of the types of equipment the automated shut-down or lockout process may be applied and does not represent that all of these pieces of equipment must either be at the same geographical location or be simultaneously controllable by the shut-off command transmitted by a single mobile device.

In another embodiment, the more than one piece of equipment, or more than one part of a single piece of equipment, may be independently and concurrently controlled by remote commands from the mobile device 18. Multiple sets of EMR receivers 366 and associated EMR activated relays 368, each controlling a different function of the system components, may be utilized. The detection system 10 may control an EMR receiver and EMR activated relay may stop a decontamination process in response to detecting that the analyte of interest is at an acceptable level. Thus, both a shutdown of a decontamination process and a removal or initiation of a lockdown of the normal operation of the equipment may be controlled by signals automatically generated by the detection system 10 or passed on by the detection system from the server 26. In yet other embodiments, only the lockdown function to prevent of the equipment's normal function may be automatically controlled and the shut-off of the decontamination process may be accomplished manually upon receipt and display to the user of the completion notification as described above.

Management and safety override functions are contemplated to release or reset the systems affected by a shutdown. In one implementation, it is contemplated that interlock (lockdown) activation when a analyte level is too high may also trigger the detector system 10 to record the time and GPS location of the initiation and termination of signals for the shutdown. The mobile device 18 may store this locally in memory 356 and/or transmit this information to the remote server 26. When the interlock is triggered, the mobile device 18 may also concurrently generate and transmit a notification of the interlock activation to a management device or devices. The notification may be an automatically generated call, text, email or other communication and may include the time and location of the shutdown, as well as details on the user and specific equipment affected. If in reply an authorized management signal is subsequently received at the mobile device 18, the shutdown equipment may be released from the interlock shutdown command and resume operation.

An advantage of the mobile device 18 and portable detector 12 is that these components can be used on or at a specific location to send real-time data from the probe or probes to a remote server for interpretation in real-time. Alternatively, the real-time data from the probe(s) may be interpreted and processed locally at the mobile device to provide analyte level information, rather than sending the data to the server for calculation of the analyte levels. The user of the system, during a decontamination process or analyte free detection process, may be able to use the real-time detection and certification of analyte level to shut off the decontamination process or entry/exist process at a point much earlier than a default process might require. This on-site detection and verification may also avoid the need to re-clean a sample that was cleaned with a default decontamination process but later received results from the physical sample that indicated more decontamination was necessary. Although the notification of completion of the process in real-time described above provides the opportunity to save on time and decontamination materials over a default decontamination process, an automated shut-off command may provide an even greater process improvement.

The alternative automated shut-off embodiments may avoid the need for a user to wait and keep looking at the displayed real-time contamination level results during a decontamination process and, when the completion notification does arrive, manually shut down the decontamination process. In yet other embodiments, the system may include the ability to prevent use of a sample surface or area that has not been cleaned or that has been cleaned, but not to a standard registered in the server to require.

As described previously, the probe 20 and detector circuitry 22 of a portable detector 12 that may be used in the detection system 10 described herein may be configured for measuring the presence of one or of multiple different analytes. Due to the ability of the detection system to detect and transmit information in real-time, difficult to distinguish substances such as viruses and bacterium may be more successfully differentiated. Signals from different probes may be combined in the present system to allow the computation layer of the server to interpret the signals in real-time using a comparison algorithm based on predetermined operating characteristics of the particular probe or probe technology.

Figure 7:
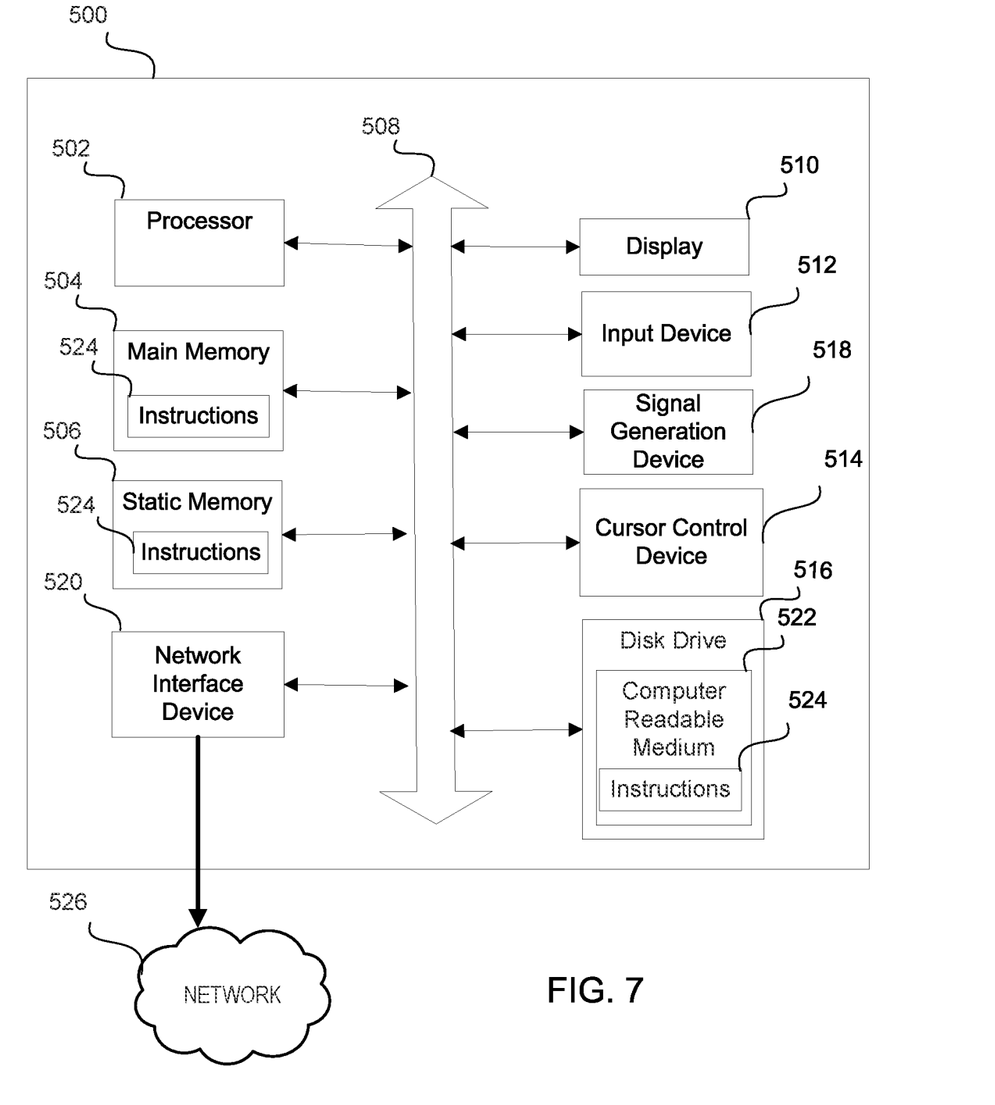

Referring to FIG. 7, an illustrative embodiment of a general computer system that may be used in, or for, one or more of the components described above, or in any other system configured to carry out the methods discussed above, is shown and is designated 500. The computer system 500 can include a set of instructions that can be executed to cause the computer system 500 to perform any one or more of the methods or computer-based functions disclosed herein. The computer system 500 may be mobile or non-mobile, operate as a stand-alone device, or may be connected using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 7, the computer system 500 may include a processor 502, such as a central processing unit ("CPU"), a graphics processing unit ("GPU"), or both. Moreover, the computer system 500 can include a main memory 504 and a static memory 506 that can communicate with each other via a bus 508. As shown, the computer system 500 may further include a video display unit 510, such as a liquid crystal display ("LCD"), an organic light emitting diode ("OLED"), a flat panel display, a solid state display, signal light, or a cathode ray tube ("CRT"). Additionally, the computer system 500 may include one or more input devices 512, such as a keyboard, scanner, digital camera or audio input device, and a cursor control device 514, such as a mouse. The computer system 500 can also include a memory unit 516, which may be a solid state or a disk drive memory, a signal generation device 518, such as a speaker or remote control, and a network interface device 520.

In a particular embodiment, as depicted in FIG. 7, the memory unit 516 may include a computer-readable medium 522 in which one or more sets of instructions 524, such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal; so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories, such as flash memory. Further, the computer-readable medium can be a random access memory or other volatile re-writable memory. Additionally, the computer-readable medium can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

According to yet another aspect, a method for managing analyte certification data based on real-time testing of analytes at local stages of production of a product is provided. The method may be executed in a system having a plurality of product handling facilities at different geographic locations, where each of a plurality of portable analyte detection systems located at a respective one of the product handling facilities is in communication with a central analyte tracking server. In this system, the central analyte tracking server receives user and device identification from a portable analyte detection system at one of the plurality of product handling facilities. The server also receives real-time analyte detection data from the portable analyte detection system. The server determines a analyte type and a current analyte level data from the received analyte detection data, and then transmits the current analyte level data to the portable analyte detection system for display at the portable analyte detection system. Determining the analyte type and transmitting the current analyte level data is performed in real-time and, in response to determining that the current contamination level has reached a desired threshold, the server transmits a completion notification to the portable analyte detection system. According to one embodiment, after determining the analyte type and transmitting the current analyte level data in real-time, a signal to perform a decontamination step is optionally sent. The decontamination step may then be performed and continued until an acceptable level of analyte contamination is achieved. The decontamination step may be performed by any acceptable decontamination apparatus appropriate for the target demonstrating contamination. The step of cleaning or decontaminating a target may include the step of producing a mist, aerosol or other acceptable air-based liquid suitable to decontamination of a target. The liquid portion of the mist or aerosol may be a decontamination composition capable of killing, elimination or otherwise reducing the presence of a pathogen.

Although the present specification describes components and functions that may be implemented in particular embodiments with reference to particular standards and protocols commonly used by financial institutions, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Prophetic Example 1

Analyte Detection and Quantification in Dental Offices

The systems provided herein may be utilized to aid in high detection, quantification and monitoring of analytes such as viruses (e.g., SARS-CoV-2) via implementation of systems in dental offices. Dental offices deal with several oral diseases but are also subject to common disease and viral threats such as HIV, Hepatitis, Flu, and Corona Viruses such as SARS-CoV-2. The United States dental industry has over 150,000 dental hygienists which see roughly 8 patients a day or roughly 1,200,000 per day nationwide (0.38% of United States population daily or approximately 7.5% of population monthly). More than half of the United States population visits a dental hygienist at least once per year. Dental hygienists are trained to deal with both saliva and blood and the real potential that the patient could be contagious with various analytes such as SARS-CoV-2. Using the systems provided herein to detect for these potential viral analytes prior to a dental exam can serve at least three purposes: (i) prevent transmission to the dental worker of other professional; (ii) diagnose a patient while providing early intervention; and (iii) monitor analytes to help prevent outbreak, epidemic, or pandemic.

According to one embodiment, the systems provided herein may be utilized to screen or otherwise detect an analyte for each patient prior to or upon entering a dental office (HIPAA compliance required). The system may be located in a lobby or separate area such that results regarding analyte infection may be provided prior to entry into the office and subsequent dental treatment. Screening may occur with a saliva or blood sample from a patient. Such a screening process may be financially subsidized by a patient's dental insurance as well as supported by both the ADA and the AMA. According to one embodiment, the systems provided herein may be utilized to provide the dental office with an additional source of revenue via patient screening.

According to one embodiment, the systems provided herein may be utilized to monitor the rinse water from a dental "rinse" sink. The results of such monitoring may be sent to a third monitoring service. According to such an embodiment, the system provides a reliable sampling of the general United States population. Since the sampling device is connected to a rinse sink, the water collected is less variable and more reliable for the sampler allowing for simpler design. By enumerating the patients, geolocating the sink, and sending the data to a central location (e.g., cloud-based server), the system may function as a digitized monitoring system for mapping results across a geographic location.

According to another embodiment, the systems provided herein may be utilized to monitor the rinse water from a dental suction line used during a dental cleaning or procedure. The results of such monitoring may be sent to a third monitoring service. According to such an embodiment, the system provides a reliable sampling of the general population in a city, county state or country. Since the sampling device is connected to a suction line, the water collected is less variable and more reliable for the sampler allowing for simpler design. By enumerating the patients, geolocating the suction line, and sending the data to a central location (e.g., cloud-based server), the system may function as a digitized monitoring system for mapping results across the United States. After sampling rinse water from a particular patient, the system may initiate a cleaning and decontamination step of the suction line and any components within the system. According to a particular embodiment, the cartridge within the system may then be removed and replaced with a new cartridge or cleaned prior to next use.

The systems provided herein can also become part of the normal maintenance of those managing the dental office making the detection and monitoring method seamless. The statistical relevance of this type of monitoring allows for non-HIPAA collection of data while monitoring the health of a particular region and, in turn, the overall United States. In the event HIPAA laws require authorization for this type monitoring, a bypass switch can be installed and the system will reduce the sample size for analysis by that number.

Prophetic Example 2

Analyte Detection and Quantification in Agricultural Applications

The systems provided herein may be utilized to aid in high throughput detection, quantification and monitoring of analytes such as agricultural inputs (e.g., herbicides such as dicamba) via implementation of detection and monitoring systems on farms or food processing plants. Farmers are faced with the need to use agricultural inputs on their crops to maximize the productivity. The spray equipment is expensive, often in the hundreds of thousands of dollars, The spray equipment is required to apply different agricultural inputs. A serious problem arises when the farmer needs to use a sprayer on a crop when the spray equipment has previously been used to apply a pesticide that is dangerous to the current crop. To apply an agricultural input safely, the farmer must ascertain that the spray equipment is, in fact, clean enough to use as a tool for spraying the current crop. Current practice is to run clean water through the equipment for a given time and assume it is clean. Some agricultural inputs such as dicamba, however, can be significantly damaging to the current crop if such agricultural inputs are even left in the parts per trillion level as residue in the equipment. Using the systems provided herein to detect for these potential crop input analytes prior to use can prevent the farmer from damaging the current crop to be treated or even crops adjacent to the current crop.

The systems provided herein may be also utilized to screen or otherwise detect an analyte for each previously used target farm input prior to loading with another input and used for that decision only. The systems provided herein may be also utilized with an automatic interlock that would prevent the sprayer from being operated if the requisite test is not performed successfully. The systems provided herein may also initiate a decontamination procedure to remove crop input analytes prior to further use.

The systems provided herein may be also utilize to send collected data regarding agricultural input presence and levels to a monitoring service. According to such an embodiment, the system provides a reliable record of the data that could be accessed by interested third parties such as insurance companies or downstream consumers of the food produced.

Prophetic Example 3

Analyte Detection and Quantification in Industrial Food Processing Applications

The systems provided herein may be utilized to aid in high throughput detection, quantification and monitoring of pathological analytes in industrial applications such as in food processing (and packaging) plants. Particularly, a system as provided herein may be used in conjunction with a piece of processing equipment or vessel to detect, quantify and monitor pathological analytes. A system as provided herein may be used to detect, quantify and monitor, for example, aflatoxin levels during peanut butter production or melamine during milk production. A system as provided herein may be used to detect, quantify and monitor, any bacteria or fungus present during food processing.

The systems provided herein may be also utilized with an automatic interlock system that shuts down food production upon detection of a pathological analyte at a certain level. Using the systems provided herein to detect for these pathological analytes can prevent food spoilage and contamination thereby also preventing food-borne illness by the consumer. The systems provided herein may also initiate a decontamination procedure to remove the pathological analyte from the equipment or vessel prior to resuming food production.

The systems provided herein may be also utilize to send collected data regarding pathological analyte presence and levels to a monitoring service. According to such an embodiment, the system provides a reliable record of the data that could be accessed by interested third parties such as insurance companies or downstream consumers of the food produced.

Prophetic Example 4

Analyte Detection and Quantification in Food Preparation

The systems provided herein may be utilized to aid in high throughput detection, quantification and monitoring of pathological analytes in restaurant or industrial kitchen applications such as in food preparation. Particularly, a system as provided herein may be used in conjunction with a piece of food preparation equipment or directly on a food itself to detect, quantify and monitor pathological analytes. A system as provided herein may be used to detect, quantify and monitor, for example, *Escherichia coli* levels on a vegetable susceptible to bacterial contamination such a lettuce, spinach, broccoli, or brussel sprouts. A system as provided herein may be used, however, to detect, quantify and monitor, any bacteria or fungus present one a vegetable.

The systems provided herein may be also utilized with an automatic alert system that signals that food preparation with a test food should cease upon detection of a pathological analyte at a certain level. Using the systems provided herein to detect for these pathological analytes can prevent food spoilage and contamination thereby also preventing food-borne illness by the restaurant customer. The systems provided herein may also initiate a decontamination procedure to remove the pathological analyte from the preparation equipment or vegetable itself prior to resuming food preparation.

The systems provided herein may be also utilize to send collected data regarding pathological analyte presence and levels to a monitoring service. According to such an embodiment, the system provides a reliable record of the data that could be accessed by interested third parties such as a health department.

Prophetic Example 5

Airborne Analyte Detection, Quantification and Monitoring in Building Applications The systems provided herein may be utilized to aid in high throughput detection, quantification and monitoring of airborne analytes in a building or room such as an office space, workout or training space, or a hospital space (e.g., surgical theater, typical hospital room, emergency room, or similar space). The systems may detect, quantify and monitor any target pathological analytes or other analyte (e.g., unwanted chemical) that may be airborne. Such a system may utilize a plurality of portable detectors (e.g., array of detectors) spread throughout one room or throughout an entire building facility. All results related to detection, quantification and monitoring may be displayed in real-time on a central mobile device or a plurality of mobile devices throughout the building.

The systems provided herein may be also utilized with an automatic interlock or other type of security system that would prevent individuals from entering a space within a building until an acceptable level analyte is obtained. Particularly, a door may be locked preventing entry or exist from a particular room. The systems provided herein may also initiate a decontamination procedure to remove or filter out the airborne analyte prior to re-entry.

Although specific embodiments of the present invention are herein illustrated and described in detail, the invention is not limited thereto. The above detailed descriptions are provided as exemplary of the present invention and should not be construed as constituting any limitation of the invention. Modifications will be obvious to those skilled in the art, and all modifications that do not depart from the spirit of the invention are intended to be included with the scope of the appended claims.

We claim:

1. An analyte detection and monitoring system comprising:
   at least one portable detector having a probe and detector circuitry for detecting an analyte in a sample and producing analyte detection data; and
   at least one mobile device configured to wirelessly receive the analyte detection data from the portable detector, transmit the analyte detection data from the portable detector to a processor in real-time, and transmit a certification from the mobile device that an analyte level in the sample is at a predetermined acceptable level or that the level is unacceptable, wherein the at least one mobile device is configured to transmit a signal to initiate a decontamination operation when a predetermined level of analyte contamination is achieved.

2. The analyte detection system of claim 1, wherein the at least one mobile device is configured to receive and display a decontamination completion notification received from the processor in response to determination by the processor that the transmitted analyte detection data indicates an analyte level in the sample, if present, has reached a predetermined level.

3. The analyte detection system of claim 2, wherein the at least one mobile device is further configured to, in response to receiving the decontamination completion notification, automatically transmit a shut-off instruction to decontamination equipment being used in the decontamination operation.

4. The analyte detection system of claim 3, wherein subsequent to transmitting the shut-off instruction, the at least one mobile device is configured to transmit an identifier to the processor.

5. The analyte detection system of claim 1, wherein the at least one mobile device is further configured to, in response to receiving real-time analyte level data processed by the processor from the analyte detection data, within a predetermined analyte level range, automatically transmit a shut-off instruction to processing or safety equipment in communication with the mobile device.

6. The analyte detection system of claim 1, wherein the at least one mobile device is selected from the group consisting of a smartphone, tablet, and portable computer.

7. The analyte detection system of claim 1, wherein the portable detector and mobile device are integrated into a single, mobile, hand-held system.

8. The analyte detection system of claim 1, wherein the at least one portable detector comprises a plurality of probes, each of the probes configured to detect a different analyte.

9. The analyte detection system of claim 1, wherein the portable detector includes a collection apparatus configured to receive a target sample.

10. The analyte detection system of claim 1, wherein the at least one mobile device is configured to:
wirelessly receive analyte detection data from the portable detector for each of a plurality of probes and to transmit the analyte detection data from the portable detector to a processor in real-time; and
receive and display on the mobile device real-time analyte level data for each of a plurality of different analytes determined by the processor from the analyte detection data for the plurality of probes.

11. A method of determining and monitoring analyte level in a sample, the method comprising the steps of:
introducing a probe of a portable detector system to a sample, wherein the probe is configured to detect at least one analyte in the sample;
wirelessly transmitting analyte detection signals from detection circuitry in communication with the probe to a mobile device of the portable detector system;
transmitting, in real-time, the analyte detection signals from the mobile device to a processing system;
receiving by the mobile device, in response to the transmitted analyte detection signals, real-time analyte level data processed by the processing system from the analyte detection signals;
displaying the real-time analyte level data to a user on a display of the mobile device such that the level of analyte is viewable and continuously monitored;
transmitting a certification from the mobile device that an analyte level in the sample is at a predetermined acceptable level or that the level is unacceptable;
initiating decontamination; and
receiving at the mobile device a decontamination completion notification from the processing system in response to determination by the processing system that the transmitted detection signals indicates an analyte level in the sample has reached the predetermined acceptable level.

12. The method of claim 11, wherein the sample is taken from a surface, air, human or animal.

13. The method of claim 11, wherein the sample is taken from an industrial equipment component surface or a food surface.

14. The method of claim 11, wherein the sample is taken from a public or private space selected from the group consisting of a food processing facility, healthcare facility, airport, train station, border crossing, training facility, and office space.

15. The method of claim 11, wherein the portable detector system comprises a plurality of probes, each of the probes configured to detect a different analyte; and
wherein the method further comprises concurrently transmitting analyte detection signals from detection circuitry in communication with each of the plurality of probes to the mobile device of the portable detector system.

16. The method of claim 11, wherein introducing the probe of the portable detector system to the sample comprises introducing the probe into rinsate from a rinsate collection apparatus.

17. The method of claim 11, further comprising the mobile device, in response to the decontamination completion message, transmitting a shut-off command configured to automatically shut off equipment being used in the decontamination process.

18. The method of claim 11, further comprising the step of allowing entry or exit of an animal or human that exhibits a predetermined acceptable level of analyte, the analyte comprising one or more of a bacterium or virus.

* * * * *